US008233884B2

(12) United States Patent
Snyder

(10) Patent No.: US 8,233,884 B2
(45) Date of Patent: Jul. 31, 2012

(54) INFORMATION SERVICE PHONEBOOK UPDATE

(75) Inventor: Thomas David Snyder, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1167 days.

(21) Appl. No.: 10/709,182

(22) Filed: Apr. 20, 2004

(65) Prior Publication Data

US 2005/0233730 A1 Oct. 20, 2005

(51) Int. Cl.
*H04L 12/58* (2006.01)
(52) U.S. Cl. ............... 455/412.1; 455/415; 455/414.2
(58) Field of Classification Search ............... 455/466, 455/412.1, 558, 550.1, 414.2, 414.3, 415, 455/563, 412
See application file for complete search history.

(56) References Cited

U.S. PATENT DOCUMENTS

| | | | | |
|---|---|---|---|---|
| 4,593,157 | A | | 6/1986 | Usdan et al. |
| 5,339,352 | A | * | 8/1994 | Armstrong et al. ........... 455/417 |
| 5,651,056 | A | * | 7/1997 | Eting et al. ................. 379/88.01 |
| 5,689,547 | A | * | 11/1997 | Molne ............................. 379/379 |
| 5,764,731 | A | * | 6/1998 | Yablon ........................ 379/88.15 |
| 5,802,149 | A | * | 9/1998 | Hanson ....................... 379/88.03 |
| 5,835,570 | A | | 11/1998 | Wattenbarger et al. |
| 5,943,611 | A | * | 8/1999 | Molne ............................. 455/564 |
| 5,974,238 | A | * | 10/1999 | Chase, Jr. ..................... 709/248 |
| 5,995,976 | A | * | 11/1999 | Walker et al. ......................... 1/1 |
| 6,185,295 | B1 | * | 2/2001 | Frederiksen et al. ..... 379/355.05 |
| 6,278,885 | B1 | * | 8/2001 | Hubbe et al. .................. 455/558 |
| 6,625,444 | B1 | * | 9/2003 | Fleming et al. ................ 455/418 |
| 6,944,283 | B1 | * | 9/2005 | Klein ........................ 379/355.04 |
| 6,947,527 | B2 | * | 9/2005 | Clark et al. ................. 379/88.03 |

(Continued)

FOREIGN PATENT DOCUMENTS

CN 1227453 A 9/1999

(Continued)

OTHER PUBLICATIONS

"Method for Automatic Directory Update Upon Encounter of Specific Callee Messages", IBM Technical Disclosure Bulletin, IBM Corp., New York, US., vol. 37, No. 1, Jan. 1994, p. 391.
Sony Ericcson Mobile Communications AB, International Application Ser. No. PCT/US2004/036691"International Search Report", May 20, 2005.

(Continued)

*Primary Examiner* — Kent Chang
*Assistant Examiner* — Kashif Siddiqui
(74) *Attorney, Agent, or Firm* — Patrick B. Horne; Moore & Van Allen

(57) ABSTRACT

A method of storing a phone number within a mobile phone that was received from an information service. The user places a call to an information service to obtain a requested phone number. The requested phone number returned from the information service is detected by the mobile phone and can be stored within the mobile phone. In one embodiment, the requested phone number is returned audibly from the information service to the mobile phone and is detected using voice recognition algorithms to parse the audible response returned from the information service into a series of numbers that make up the requested phone number. The mobile can then prompt the user whether to store the returned phone number permanently and where it should be stored. Another feature prompts the user if he would like the mobile phone to automatically dial the phone number just obtained from the information service. In addition, flags can be set to automatically store and dial the requested phone number without having to prompt the user.

33 Claims, 3 Drawing Sheets

U.S. PATENT DOCUMENTS

| | | | |
|---|---|---|---|
| 7,050,551 B2 * | 5/2006 | Beith et al. | 379/88.14 |
| 7,167,547 B2 * | 1/2007 | Stillman et al. | 379/88.23 |
| 2002/0168964 A1 * | 11/2002 | Kraft | 455/412 |
| 2003/0179866 A1 * | 9/2003 | Stillman et al. | 379/88.19 |
| 2004/0120015 A1 * | 6/2004 | Creamer et al. | 358/434 |
| 2004/0120493 A1 * | 6/2004 | Creamer et al. | 379/207.08 |
| 2004/0198329 A1 * | 10/2004 | Vasa | 455/414.1 |
| 2005/0047577 A1 * | 3/2005 | Timmins | 379/218.01 |
| 2005/0054333 A1 * | 3/2005 | Johnson | 455/414.3 |
| 2005/0079894 A1 * | 4/2005 | Shin et al. | 455/564 |
| 2005/0176451 A1 * | 8/2005 | Helferich | 455/466 |
| 2006/0148457 A1 * | 7/2006 | Borella | 455/415 |
| 2007/0121880 A1 * | 5/2007 | Stillman et al. | 379/218.01 |

FOREIGN PATENT DOCUMENTS

| | | |
|---|---|---|
| CN | 1277396 | 12/2000 |
| JP | 11-308315 | 11/1999 |
| JP | 11-341159 | 12/1999 |
| JP | 11341156 A | 12/1999 |
| JP | 2002-125053 | 4/2002 |

OTHER PUBLICATIONS

Sony Ericsson Mobile Communications AB, International Application Ser. No. PCT/US2004/036691 Written Opinion, May 20, 2005.
Patent Office of the People's Republic of China, First Office Action, Apr. 11, 2008.
State Intellectual Property Office, P.R. China. Third Office Action. Mar. 23, 2010. 6 pgs.
Japanese Patent Office. Official Action. Apr. 28, 2010. 3 pgs.
State Intellectual Property Office, P.R. China, Fourth Office Action, Aug. 3, 2010, issued in Chinese Patent Application No. 200480042204.6.
Japanese Patent Office; Decision of Rejection; Nov. 25, 2011; issued in Japanese Patent Application No. 2007-509451.
Indian Patent Office; First Examination Report; Aug. 30, 2011; issued in Indian Patent Application No. 4516/DELNP/2006.

* cited by examiner

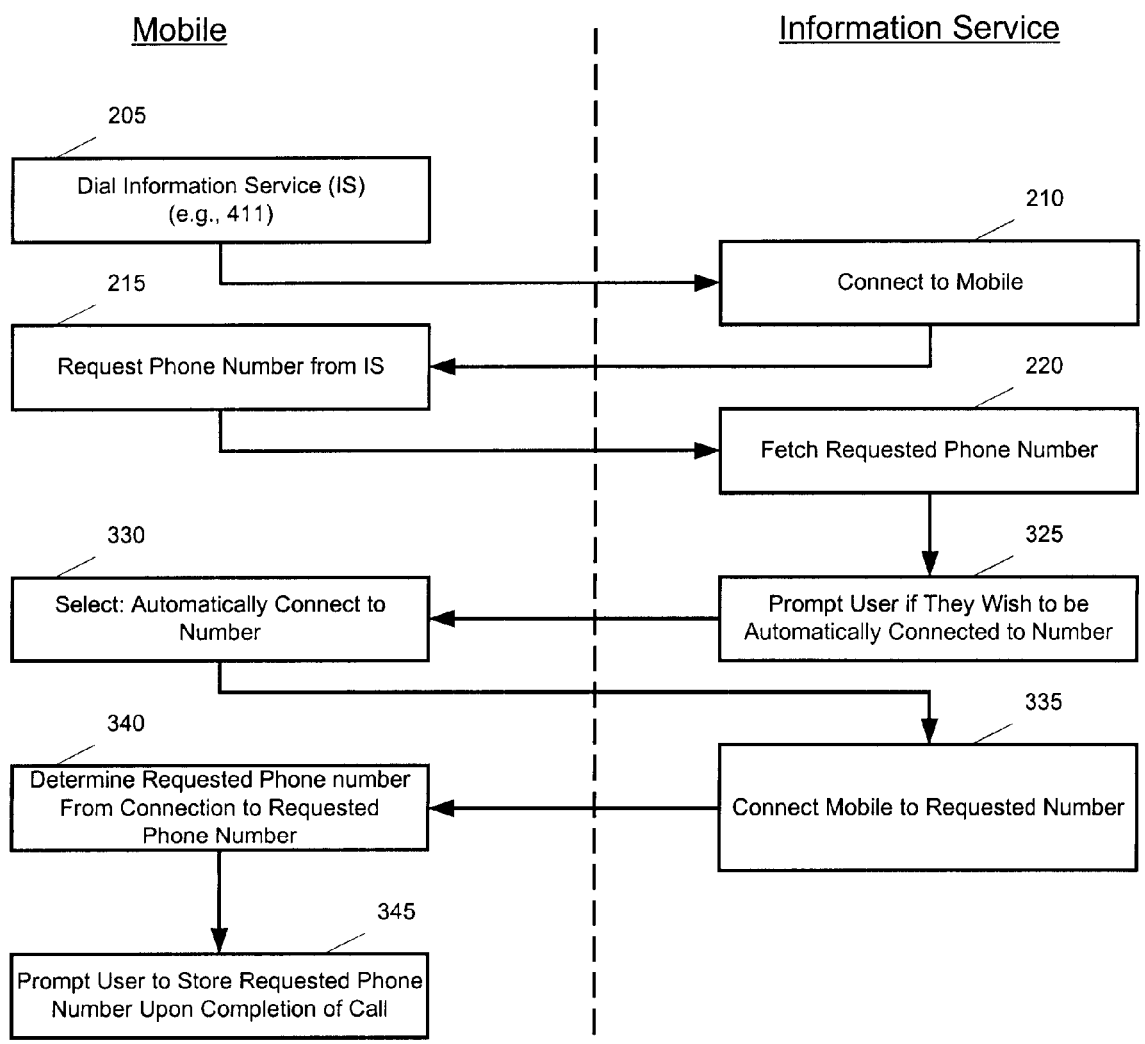

INFORMATION SERVICE PHONEBOOK UPDATE

BACKGROUND OF INVENTION

Mobile phone users often find the need to call an information service (IS) such as '411' to obtain phone numbers that they do not know. As mobile phones are typically used when a user is "mobile", it is common for the user not to have paper and pen readily available to write down the requested number. Even if the requested number is written down, it can be lost or forgotten. The current industry solution is to have the IS dial the requested number for you once the requested number is fetched. Basically, the IS will redirect your call to the requested number so you don't have to write down or remember the number.

The drawback to this solution is that the requested number is not retained. Often, someone will need to call the number multiple times, requiring them to potentially call the IS each time. This is costly as most services charge a fee for finding a phone number. There is often an additional charge to be directly connected after the requested number is given. Moreover, it is slow compared to directly calling the number in the first place.

What is needed is a means for retaining the requested number in the mobile phone once it is received from the IS. If retained, the user will not need to re-call the IS to obtain the same number.

SUMMARY OF INVENTION

The present invention describes a method of storing a phone number within a mobile phone that was received from an information service. The user places a call to an information service to obtain a requested phone number. The requested phone number returned from the information service is detected by the mobile phone and can be stored within the mobile phone. In one embodiment, the requested phone number is returned audibly from the information service to the mobile phone and is detected using voice recognition algorithms to parse the audible response returned from the information service into a series of numbers that make up the requested phone number. The mobile can then prompt the user whether to store the returned phone number permanently and where it should be stored. Another feature prompts the user if he would like the mobile phone to automatically dial the phone number just obtained from the information service. In addition, flags can be set to automatically store and dial the requested phone number without having to prompt the user.

Another embodiment has the information service send a text message to the mobile phone. The text message contains the requested phone number. When the mobile phone receives the text message, it can open, read, dial, and/or store the phone number permanently.

BRIEF DESCRIPTION OF DRAWINGS

FIG. 3 is a flowchart detailing the logic flow for yet another embodiment of the present invention.

DETAILED DESCRIPTION

The present invention can be implemented by software within the phone that recognizes when an information service (IS) has been called. A software implementation allows for easy retrofitting of existing mobile phones. Many mobile phones can be over-the-air (OTA) provisioned with the software comprising the present invention without causing the user any inconvenience.

Figure 1:
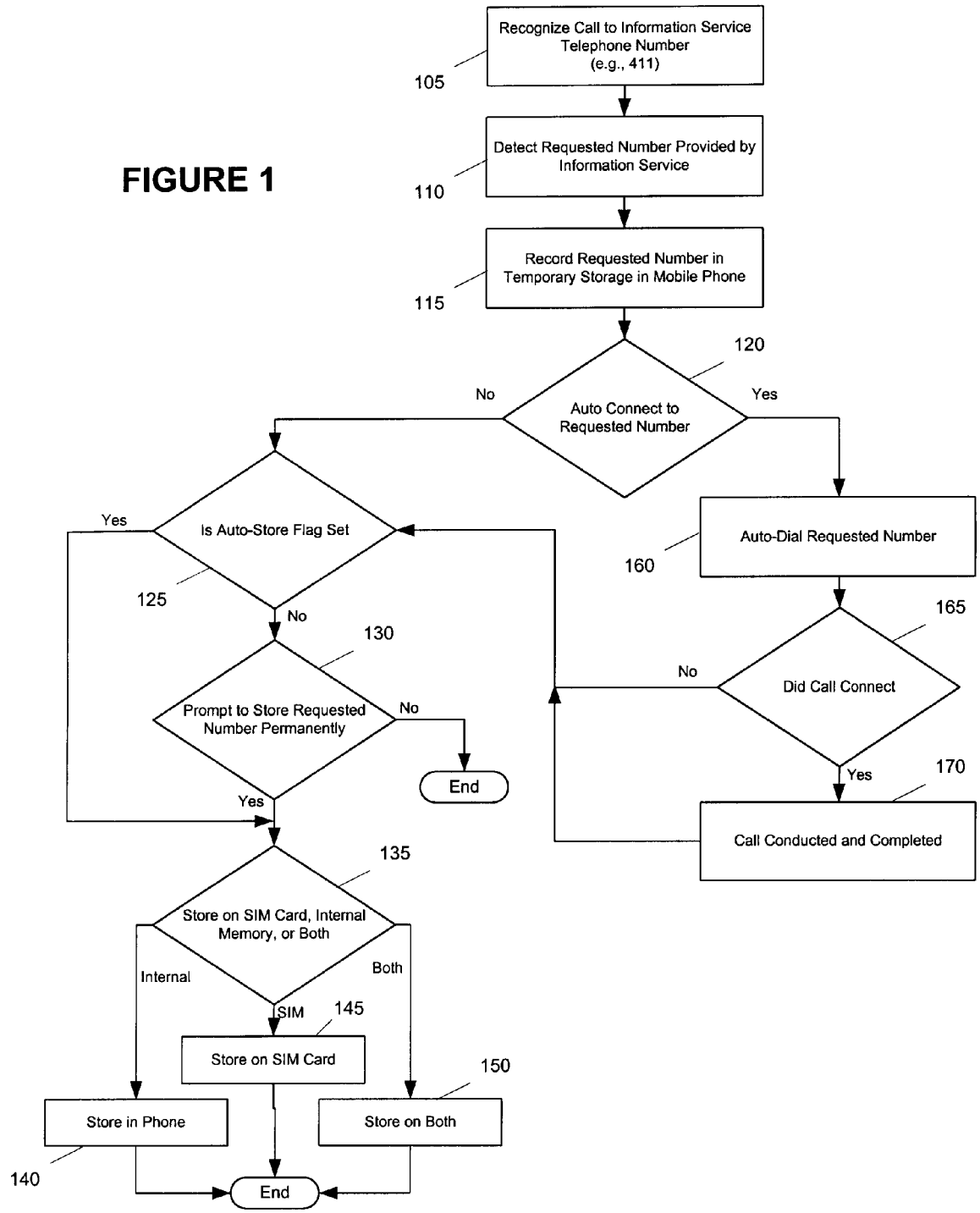
FIG. 1 is a flowchart detailing one embodiment for carrying out of the present invention.

FIG. 1 is a flowchart detailing the logic flow for one embodiment of the present invention. In this embodiment, the mobile phone audibly receives and can copy the requested number into memory.

The first step in the process is for the user to place a call to an information service 105 such as '411'. The information service fetches and audibly returns the requested number. The mobile phone then "listens" for the number 110 and records it 115 into temporary memory within the mobile phone. The "listening" feature can comprise existing voice recognition algorithms such as those used in voice dialing, recognition of DTMF tones, or other means. At this point, the mobile phone as opposed to the information service can prompt the user whether to autoconnect 120 to the requested number.

If auto-connect is selected, the mobile phone will automatically dial the requested number 160. A check is made to determine if the call connected 165. If so, the call is conducted normally and upon completion the mobile phone checks if an auto store flag is set 125. If the call does not connect, the mobile phone checks if the auto store flag is set 125. The auto store flag determines whether the requested number is to be automatically stored or not.

If the flag is not set, the user is prompted whether to permanently store 130 the requested number into memory. If the user decides not to store the number then the process is terminated. If the user decides to permanently store the number, he is prompted where to store the number 135. His choices include storing the number internally in the mobile phone 140, on a SIM card 145, or both 150. Once the number is stored the process terminates.

Figure 2:
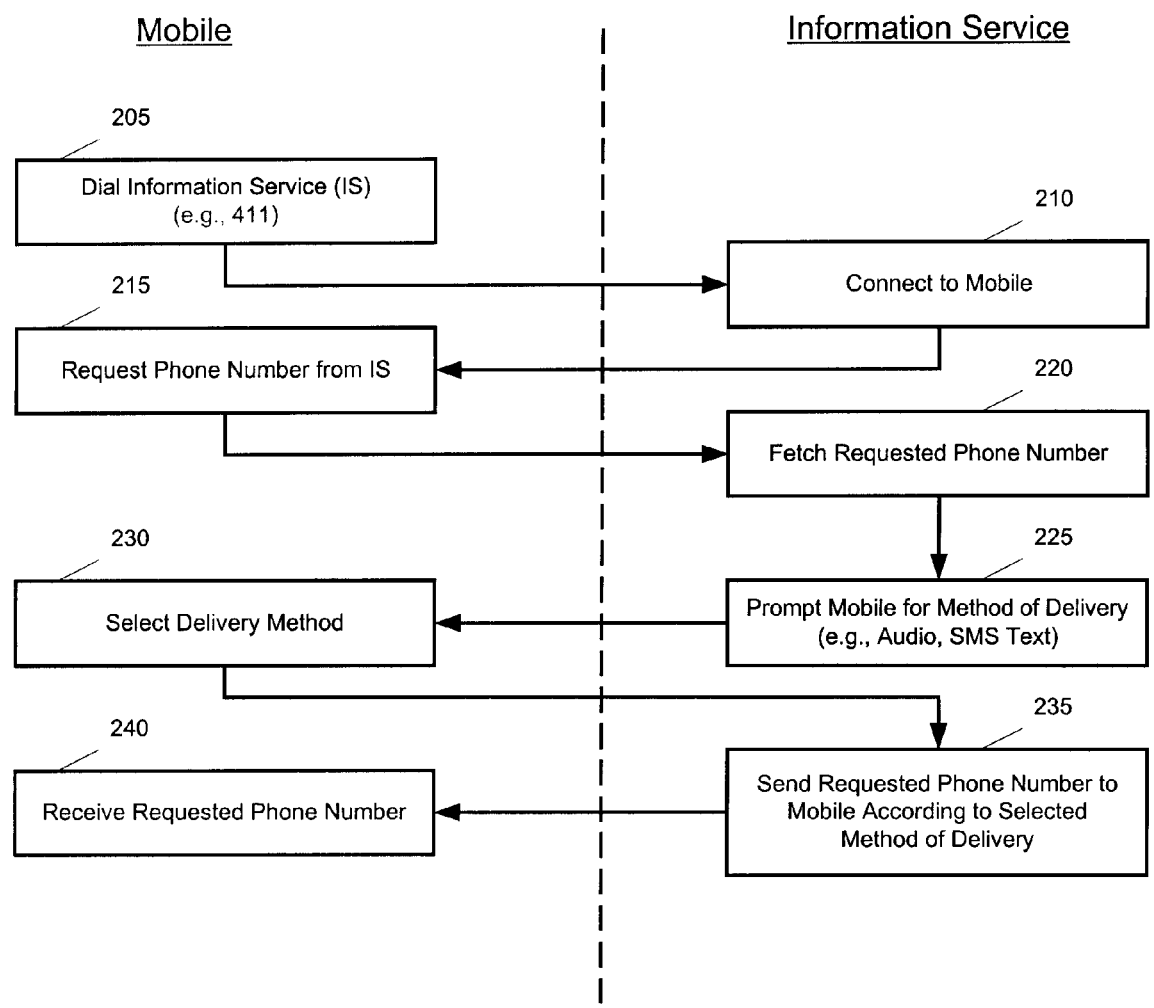
FIG. 2 is a flowchart detailing another embodiment for carrying out of the present invention.

FIG. 2 is a flowchart detailing the logic flow for another embodiment of the present invention. In this embodiment, the mobile phone can request that the IS send the requested phone number via an SMS text message to the mobile phone. Just as before the process begins with the user connecting to an information service 205. The call is connected 210 and the user requests a number from the information service 215. The information service fetches the requested number 220 and prompts the user for a method of delivery 225. Methods of delivery include audible delivery or SMS text messaging of the requested number to the mobile phone. The user selects a delivery method 230 and the information service sends the requested number 235 according to the selection made by the user. The user's mobile phone then receives the requested phone number 240.

If the user selected audible delivery, the process described in FIG. 1 applies. If the user selected SMS text delivery, the information service composes and sends an SMS text message containing the requested number. Once the text message is received and is opened the user can dial the requested number. Upon call completion, the mobile phone can prompt the user to store the number in permanent memory.

FIG. 3 is a flowchart detailing the logic flow for yet another embodiment of the present invention. In this embodiment, the mobile phone can request that the IS automatically connect the mobile to the requested number and detect the number at the same time. Just as before the process begins with the user connecting to an information service 205. The call is connected 210 and the user requests a number from the information service 215. The information service fetches the requested number 220. At this point, the IS prompts the mobile phone whether to automatically connect to the requested phone number 325. If the mobile phone user selects this option 330, the IS proceeds to connect the mobile phone to the requested number 335. Meanwhile, software within the mobile phone determines the number it is being connected to by requesting and receiving the information via a network function 340. At the conclusion of the call, the mobile phone prompts the user if he wishes to permanently store the requested phone number into memory 345.

The IS feature of the present invention is generally triggered by a predetermined table of information service numbers. When one of these numbers, such as 4-1-1, is called, the phone algorithm for detecting and storing the number is activated. The IS feature could also be collaboratively developed between the information service and the mobile manufacturer. There could be a new option when a user calls the information service where the user can opt to have the number sent from the service directly into the phone. Similar to today's direct connect option, this direct store option could be a premium (pay) service and source of revenue for the information service.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain or store the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of prompting a user of a mobile phone for input regarding whether to store a phone number in a permanent memory of the mobile phone, said phone number received from an information service, the method comprising:
   placing a call to an information service at an information service phone number to obtain a requested phone number different from the information service phone number;
   prompting a user of the mobile phone for a method of delivery of the requested phone number by presenting a plurality of methods of delivery, the plurality of methods of delivery comprising audible delivery, wherein each method of delivery comprises a different channel for transmitting the requested phone number to the mobile number;
   transmitting a user selection of a method of delivery for the requested phone number;
   receiving the requested phone number at the mobile phone from the information service in response to the information service receiving a user selection of the method of delivery;
   determining, using the mobile phone, the requested phone number returned from the information service in accordance with the selection made by the user; and
   prompting the user, after completion of the call, for input regarding whether to store the requested phone number.

2. The method of claim 1, further comprising storing, in response to user input, the requested phone number returned from the information service in a permanent memory of the mobile phone.

3. The method of claim 2 wherein storing the requested phone number returned from the information service in a permanent memory of the mobile phone further comprises prompting the user of the mobile phone for input regarding where to store the returned phone number.

4. The method of claim 3 wherein the returned phone number is stored within the mobile phone's phonebook directory.

5. The method of claim 3 wherein the returned phone number is stored on a SIM card attachable to the mobile phone.

6. The method of claim 1 further comprising prompting the user for input regarding whether to automatically dial the returned phone number.

7. The method of claim 1 wherein storing the requested phone number returned from the information service in a permanent memory of the mobile phone comprises having the mobile phone automatically store the returned phone number within the mobile phone's phonebook directory.

8. The method of claim 1 wherein storing the requested phone number returned from the information service in a permanent memory of the mobile phone comprises having the mobile phone automatically store the returned phone number on a SIM card attachable to the mobile phone.

9. A method of storing a phone number in a permanent memory of the mobile phone, said phone number received from an information service, the method comprising:
   placing a call to an information service at an information service phone number to obtain a requested phone number different from the information service phone number;
   prompting a user of the mobile phone for a method of delivery of the requested phone number by presenting a plurality of methods of delivery, the plurality of methods of delivery comprising audible delivery, wherein each method of delivery comprises a different channel for transmitting the requested phone number to the mobile number;
   transmitting a user selection of a method of delivery for the requested phone number to the information service;
   receiving the requested phone number at the mobile phone from the information service in response to the information service receiving a user selection of the method of delivery;
   determining the requested phone number returned from the information service in accordance with the selection made by the user; and
   storing, after completion of the call, the requested phone number determined by the mobile phone.

10. The method of claim 9 further comprising:
opening a SMS text message; and
prompting the user of the mobile phone for input regarding whether to automatically dial the phone number contained in the SMS text message.

11. The method of claim 9 further comprising:
opening a SMS text message; and
prompting the user of the mobile phone for input regarding whether to store the phone number contained in the SMS text message before storing the phone number contained in the SMS text message.

12. The method of claim 11 further comprising prompting the user of the mobile phone for input regarding where to store the phone number contained in the SMS text message.

13. The method of claim 12 wherein the phone number contained in the SMS text message can be stored within the mobile phone's phonebook directory.

14. A computer program product comprising a non-transitory computer-readable memory comprising computer-executable code configured for prompting a user of a mobile phone for input regarding whether to store a phone number in a permanent memory of the mobile phone, said phone number received from an information service, the computer-executable code, when executed by the mobile phone, configured to:
place a call to an information service at an information service phone number to obtain a requested phone number different from the information service phone number;
prompt a user of the mobile phone for a method of delivery of the requested phone number by presenting a plurality of methods of delivery, the plurality of methods of delivery comprising audible delivery, wherein each method of delivery comprises a different channel for transmitting the requested phone number to the mobile number;
transmit a user selection of a method of delivery for the requested number;
receive the requested phone number at the mobile phone from the information service in response to the information service receiving a user selection of the method of delivery;
determine the requested phone number returned from the information service in accordance with the selection made by the user; and
prompt the user, after completion of the call, for input regarding whether to store the requested phone number.

15. The computer program product of claim 14, wherein the computer-executable code is further configured to cause the computer to store the determined requested phone number in a permanent memory of the mobile phone.

16. The computer program product of claim 15 wherein the computer-executable code configured to cause the computer to store the determined requested phone number in a permanent memory of the mobile device further comprises computer-executable code configured to prompt the user of the mobile phone for input regarding where to store the returned phone number.

17. The computer program product of claim 16 wherein the returned phone number is stored within the mobile phone's phonebook directory.

18. The computer program product of claim 16 wherein the returned phone number is stored on a SIM card attachable to the mobile phone.

19. The computer program product of claim 14 wherein the computer-executable code further comprises computer-executable code configured to prompt the user for input regarding whether to automatically dial the returned phone number.

20. The computer program product of claim 14 wherein the computer-executable code configured to store the determined requested phone number in a permanent memory of the mobile device comprises computer-executable code configured to store the determined requested phone number within the mobile phone's phonebook directory.

21. The computer program product of claim 14 wherein the computer-executable code configured to store the determined requested phone number in a permanent memory of the mobile phone comprises computer-executable code configured to store the determined requested phone number on a SIM card attachable to the mobile phone.

22. A computer program product comprising a non-transitory computer-readable memory comprising computer-executable code configured for storing a phone number in a permanent memory of a mobile phone, said phone number received from an information service, the computer-executable code, when executed by the mobile phone, configured to:
place a call to an information service at an information service phone number to obtain a requested phone number different from the information service phone number;
prompt a user of the mobile phone for a method of delivery of the requested phone number by presenting a plurality of methods of delivery, the plurality of methods of delivery comprising audible delivery, wherein each method of delivery comprises a different channel for transmitting the requested phone number to the mobile number;
transmit a user selection of a method of delivery for the requested number;
receive the requested phone number at the mobile phone from the information service in response to the information service receiving a user selection of the method of delivery;
determine the requested phone number returned from the information service in accordance with the selection made by the user; and
store, after completion of the call, the phone number determined by the mobile phone.

23. The computer program product of claim 22 wherein the computer-executable code comprises:
computer program code for opening a SMS text message; and
computer program code for prompting the mobile phone user for input regarding whether to automatically dial the phone number contained in the SMS text message.

24. The computer program product of claim 22 wherein the computer-executable code comprises:
computer program code for opening a SMS text message; and
computer program code for prompting the mobile phone user for input regarding whether to store the phone number contained in the SMS text message before storing the phone number contained in the SMS text message.

25. The computer program product of claim 24 wherein the computer-executable code further comprises computer-executable code for prompting the mobile phone user for input regarding where to store the phone number contained in the SMS text message.

26. The computer program product of claim 25 wherein the phone number contained in the SMS text message is stored within the mobile phone's phonebook directory.

27. The computer program product of claim 25 wherein the returned phone number contained in the SMS text message is stored on a SIM card attachable to the mobile phone.

28. A method of storing a phone number in a permanent memory of a mobile phone, said phone number received from an information service, the method comprising:

placing a call to an information service at an information service phone number to obtain a requested phone number different from the information service phone number;

detecting that a call has been placed to a number stored in a predetermined table of information service phone numbers;

having the information service automatically connect the mobile phone to the requested phone number;

activating a detection algorithm, in response to detecting that the call has been placed to a number stored in a predetermined table of information service phone numbers, the detection algorithm comprising:

detecting the requested phone number based on a connection established between the mobile phone and the requested phone number in response to the mobile phone being connected to the requested phone number; and storing, after disconnection of the mobile phone and the requested phone number, the detected requested phone number.

29. The method of claim 28 wherein detecting the requested phone number comprises obtaining the information via a network query and response.

30. The method of claim 29 wherein storing the requested phone number returned from the information service in a permanent memory of the mobile phone comprises prompting the mobile phone user for input regarding whether to store the returned phone number.

31. The method of claim 30 wherein storing the requested phone number returned from the information service in a permanent memory of the mobile phone further comprises prompting the mobile phone user for input regarding where to store the returned phone number.

32. The method of claim 31 wherein the returned phone number is stored within the mobile phone's phonebook directory.

33. The method of claim 31 wherein the returned phone number is stored on a SIM card attachable to the mobile phone.

* * * * *